United States Patent
Choi et al.

(10) Patent No.: US 9,140,849 B2
(45) Date of Patent: Sep. 22, 2015

(54) BACKLIGHT ASSEMBLY AND LIQUID CRYSTAL DISPLAY HAVING THE SAME

(75) Inventors: Jae-Chang Choi, Yongin-si (KR); Seong-Sik Choi, Seoul (KR)

(73) Assignee: SAMSUNG DISPLAY CO., LTD. (KR)

(*) Notice: Subject to any disclaimer, the term of this patent is extended or adjusted under 35 U.S.C. 154(b) by 690 days.

(21) Appl. No.: 12/906,971

(22) Filed: Oct. 18, 2010

(65) Prior Publication Data

US 2011/0090426 A1 Apr. 21, 2011

(30) Foreign Application Priority Data

Oct. 19, 2009 (KR) .................. 10-2009-0099303

(51) Int. Cl.
*F21V 8/00* (2006.01)
*G02F 1/1335* (2006.01)

(52) U.S. Cl.
CPC ............. *G02B 6/009* (2013.01); *G02B 6/0068* (2013.01); *G02F 1/133603* (2013.01); *G02F 1/133608* (2013.01)

(58) Field of Classification Search
None
See application file for complete search history.

(56) References Cited

U.S. PATENT DOCUMENTS

| 6,445,430 B1* | 9/2002 | Sakamoto et al. ............. 349/62 |
| 7,782,418 B2* | 8/2010 | Ke et al. ........................ 349/58 |
| 8,253,877 B2* | 8/2012 | Yen et al. ...................... 349/58 |
| 2009/0009679 A1 | 1/2009 | Ke et al. |

FOREIGN PATENT DOCUMENTS

| CN | 101017278 | 8/2007 |
| CN | 101078838 | 11/2007 |
| JP | 2006-269140 | 10/2006 |
| JP | 2007-311327 | 11/2007 |
| JP | 2009-224301 | 10/2009 |

* cited by examiner

*Primary Examiner* — Richard Kim
(74) *Attorney, Agent, or Firm* — Innovation Counsel LLP

(57) ABSTRACT

Provided are a backlight assembly with improved heat dissipation, and a liquid crystal display (LCD) having such a backlight assembly. The backlight assembly includes: a light guide plate; a light source unit disposed on a side of the light guide plate; an intermediate housing covering an upper surface of the light source unit; and a lower housing coupled to the intermediate housing to accommodate the light guide plate and the light source unit, wherein the lower housing includes: a light source unit-fixing frame to which the light source unit is fixed, the light source unit-fixing frame contacting an inner surface of the intermediate housing; and a body portion disposed under the light guide plate and coupled to the light source unit-fixing frame.

26 Claims, 12 Drawing Sheets

BACKLIGHT ASSEMBLY AND LIQUID CRYSTAL DISPLAY HAVING THE SAME

This application claims priority to Korean Patent Application No. 10-2009-0099303 filed on Oct. 19, 2009 in the Korean Intellectual Property Office, the disclosure of which is incorporated herein by reference in its entirety.

BACKGROUND OF THE INVENTION

1. Field of the Invention

The present invention relates to liquid crystal display (LCD) panels, and more particularly, to an LCD backlight assembly with improved heat dissipation.

2. Description of the Related Art

Liquid crystal displays (LCDs) are among the most widely used types of flat panel displays. Generally, an LCD includes a pair of substrates having electrodes, and a liquid crystal layer interposed between the substrates. In an LCD, voltages are applied to electrodes to generate an electric field. The electric field determines the alignment of liquid crystal molecules of a liquid crystal layer, thereby controlling the amount of light that passes through the liquid crystal layer. As a result, a desired image is displayed on the LCD.

An LCD, which is typically a passive light-emitting device, includes a liquid crystal panel that displays an image, as well as a backlight assembly that provides light to the liquid crystal panel. Backlight assemblies can be classified into direct-type backlight assemblies and edge-type backlight assemblies according to the position of light sources.

Recent efforts have focused on making LCDs more compact, lighter, and with better color reproducibility. In particular, some research efforts have focused on the use of point light sources, such as light-emitting diodes (LEDs), as light sources for backlights. However, when point light sources such as LEDs are used in backlights, it is often desirable to efficiently remove generated heat.

SUMMARY OF THE INVENTION

Aspects of the present invention provide a backlight assembly with improved heat dissipation.

Aspects of the present invention also provide a liquid crystal display (LCD) having a backlight assembly with improved heat dissipation.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a backlight assembly including: a light guide plate; a light source unit disposed on a side of the light guide plate; an intermediate housing covering an upper surface of the light source unit; and a lower housing coupled to the intermediate housing to accommodate the light guide plate and the light source unit, wherein the lower housing includes: a light source unit-fixing frame to which the light source unit is fixed, the light source unit-fixing frame contacting an inner surface of the intermediate housing; and a body portion disposed under the light guide plate and coupled to the light source unit-fixing frame.

According to another aspect of the present invention, there is provided a liquid crystal display including: a liquid crystal panel configured to display an image; a light guide plate disposed under the liquid crystal panel; a light source unit disposed on a side of the light guide plate; an intermediate housing covering an upper surface of the light source unit; and a lower housing coupled to the intermediate housing to accommodate the light guide plate and the light source unit, wherein the lower housing includes: a light source unit-fixing frame to which the light source unit is fixed, the light source unit-fixing frame contacting an inner surface of the intermediate housing; and a body portion disposed under the light guide plate and coupled to the light source unit-fixing frame.

BRIEF DESCRIPTION OF THE DRAWINGS

The above and other aspects and features of the present invention will become more apparent by describing in detail exemplary embodiments thereof with reference to the attached drawings, in which.

Like reference numerals refer to corresponding parts throughout the drawings. Also, it is understood that the depictions in the figures are diagrammatic and not necessarily to scale.

DETAILED DESCRIPTION OF THE INVENTION

Figure 1:
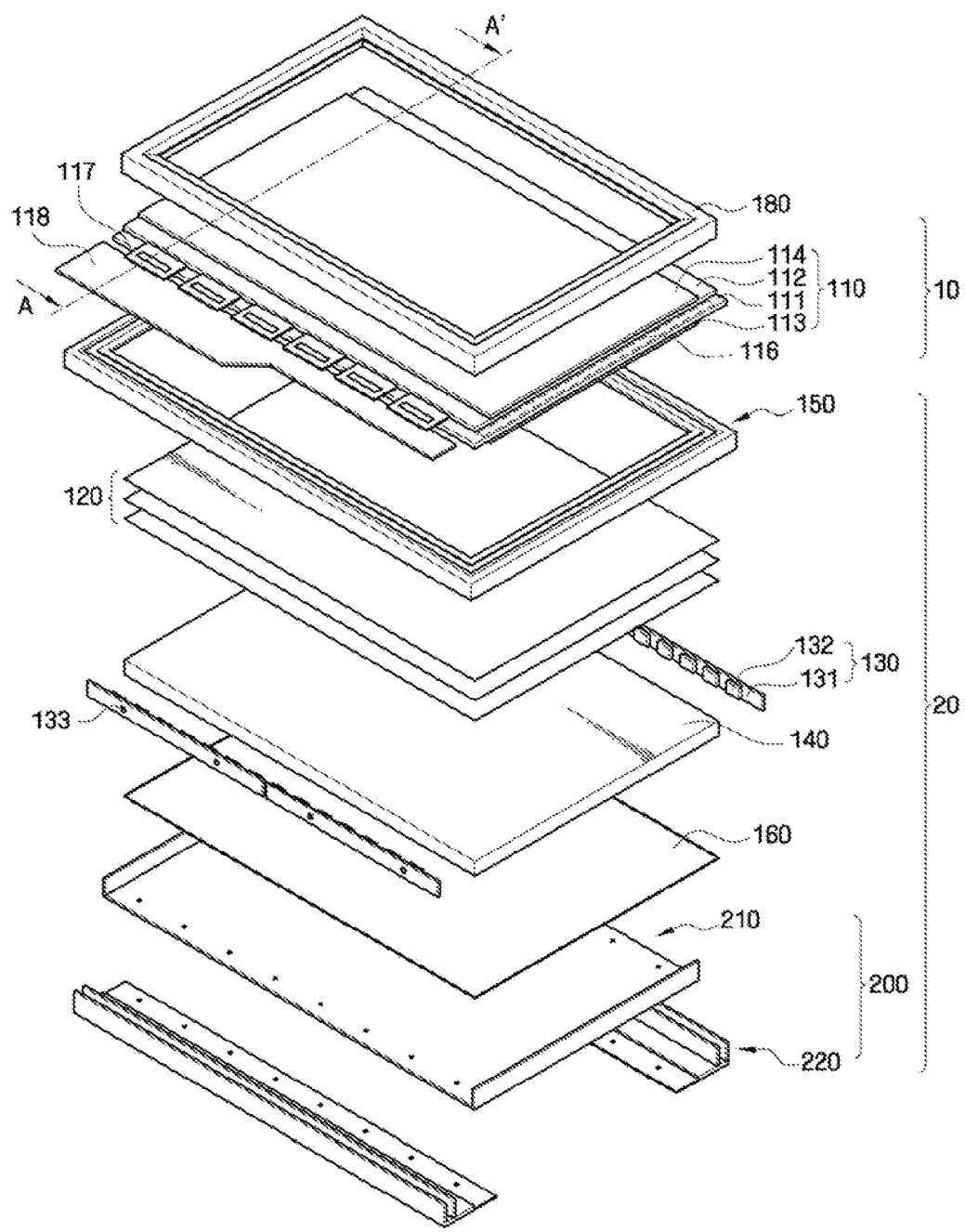
FIG. 1 is an exploded perspective view of a liquid crystal display (LCD) according to a first exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In some embodiments, well-known processing processes, well-known structures, and well-known technologies will not be specifically described in order to avoid ambiguous interpretation of the present invention. Like reference numerals refer to like elements throughout the specification.

Spatially relative terms, such as "below," "beneath," "lower," "above," "upper," and the like, may be used herein for ease of description to describe one device or element's relationship to another device(s) or element(s) as illustrated in the drawings. It will be understood that the spatially relative terms are intended to encompass different orientations of the device in use or operation in addition to the orientation depicted in the drawings. For example, if the device in the figures is turned over, elements described as "below" or "beneath" other elements or features would then be oriented "above" the other elements or features. Thus, the exemplary term "below" can encompass both an orientation of above and below. The device may be otherwise oriented and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a backlight assembly and a liquid crystal display (LCD) according to a first exemplary embodiment of the present invention will be described in detail with reference to FIGS. 1 through 7.

Figure 2:
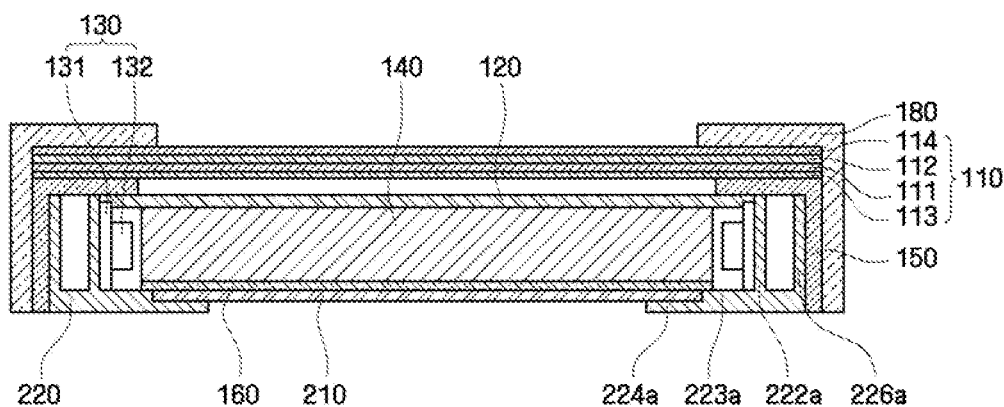
FIG. 2 is a cross-sectional view of the LCD taken along the line A-A' of FIG. 1.

FIG. 1 is an exploded perspective view of an LCD according to the first exemplary embodiment of the present invention. FIG. 2 is a cross-sectional view of the LCD taken along the line A-A' of FIG. 1.

Referring to FIGS. 1 and 2, an LCD according to the first exemplary embodiment broadly includes a liquid crystal panel assembly 10 and a backlight assembly 20.

The liquid crystal panel assembly 10 includes a liquid crystal panel 110, liquid crystals (not shown), a driving integrated circuit (IC) 116, a tape carrier package 117, a printed circuit board (PCB) 118, and an upper housing 180. The liquid crystal panel 110 includes a first substrate 111, a second substrate 112, and polarizers 113 and 114 which are respectively disposed on surfaces of the first and second substrates 111 and 112. The second substrate 112 faces the first substrate 111, the polarizer 113 is disposed under the first substrate 111, and the polarizer 114 is disposed on the second substrate 112. The first substrate 111 includes gate lines (not shown), data lines (not shown) and pixel electrodes, and the second substrate 112 includes a black matrix, color filters, and a common electrode. The color filters or the common electrode may alternatively be formed on the first substrate 111, depending on the type of the liquid crystal panel 110. Various driving parts for processing driving signals may be mounted on the PCB 118.

The upper housing 180 prevents components of the liquid crystal panel assembly 10 from moving out of place, and protects the liquid crystal panel 110 or the backlight assembly 20 from damage due to external impacts. The upper housing 180 may be shaped like a frame, composed of a flat portion and sidewall portions which extend perpendicular to the flat portion. The upper housing 180 may cover the whole of the liquid crystal panel 110 and the backlight assembly 20, or cover the whole of the liquid crystal panel 110 and only part of the backlight assembly 20. A window is formed in an upper surface of the upper housing 180 to expose the liquid crystal panel 110 for viewing.

The liquid crystal panel 110 formed by stacking the above flat plate-shaped substrates is placed on an intermediate housing 150 which will be further described below.

The backlight assembly 20 includes light source units 130, a light guide plate (LGP) 140, one or more optical sheets 120, a reflective sheet 160, the intermediate housing 150, and a lower housing 200 which includes a light source unit-fixing frame 220 and a body portion 210.

Each of the light source units 130 may include a plurality of point light sources 132, and an alignment board 131 on which the point light sources 132 are mounted. The light source units 130 according to the first exemplary embodiment of the present invention are disposed on inner surfaces of two opposing sidewalls of the lower housing 200. For example, when the LCD is rectangular, the light source units 130 may be disposed on both long sides of the LCD, facing the LGP 140. However, the present invention is not limited thereto, and the light source units 130 may also be disposed on any one or all of four sides of the lower housing 200.

The LGP 140 is housed in the lower housing 200 such that side surfaces of the LGP 140 face the light source units 130. When the light source units 130 are disposed facing opposite side surfaces of the LGP 140, light enters the LGP 140 through both side surfaces of the LGP 140 which face the light source units 130.

The LGP 140 may have any suitable shape. For example, the LGP can be a wedge-shaped plate or a flat plate. The LGP 140 may be made of a light-transmitting material, for example, acrylic resin (such as polymethyl methacrylate (PMMA)) or polycarbonate (PC).

A pattern may be formed on at least one surface of the LGP 140. For example, a diffusion pattern (not shown) may be formed on a lower surface of the LGP 140 to help direct light exiting the LGP 140 in an upward direction.

The optical sheets 120 are disposed on an upper surface of the LGP 140 and diffuse and/or concentrate light that is received from the LGP 140. The optical sheets 120 may include a diffusion sheet, a prism sheet, and a protective sheet. Of the optical sheets 120, the diffusion sheet may be located closest to the LGP 140. The diffusion sheet may diffuse light, which is received from the LGP 140, and thus prevent the light from being concentrated in a specific area. The prism sheet may have a predetermined array of triangular prisms on a surface thereof. The prism sheet may be disposed on the diffusion sheet to concentrate light from the diffusion sheet in a direction perpendicular to the liquid crystal panel 110. The protective sheet may be disposed on the prism sheet to protect the upper surface of the prism sheet. In addition, the protective sheet may further diffuse light for more uniform light distribution.

The reflective sheet 160 is disposed between the LGP 140 and the lower housing 200 and reflects light back from the lower surface of the LGP 140 toward the liquid crystal panel 110, i.e. in an upward direction.

To be reflective, the reflective sheet 160 may be made of one or more suitable materials, e.g., polyethylene terephthalate (PET). In addition, a diffusion layer containing, e.g., titanium dioxide, may be coated on a surface of the reflective sheet 160. The reflective sheet 160 may also be made of metal such as silver (Ag).

The intermediate housing 150 may be formed as a frame shaped to fit along sidewalls of the lower housing 200. For example, the intermediate housing 150 can be sized to fit over the outer and upper surfaces of the sidewalls of the lower housing 200. The intermediate housing 150 of the first exemplary embodiment is disposed on the outer surfaces of the sidewalls of the lower housing 200. The intermediate housing 150 may be coupled to the lower housing 200 by coupling members formed in sidewalls of the intermediate housing 150. The intermediate housing 150 and the lower housing 200 may be coupled to each other to accommodate the reflective sheet 160, the LGP 140, the light source units 130, and the optical sheets 120.

The intermediate housing 150 may be a mold frame made of, e.g., a plastic material, in order to prevent parts fixed in position by the intermediate housing 150 from being damaged.

The lower housing 200 includes a body portion 210 and a light source unit-fixing frame 220. The body portion 210 and the light source unit-fixing frame 220 may be coupled to each other to form a generally cuboid shaped box having an open top surface and a housing space with a predetermined depth. This will be described in further detail below.

Figure 3:
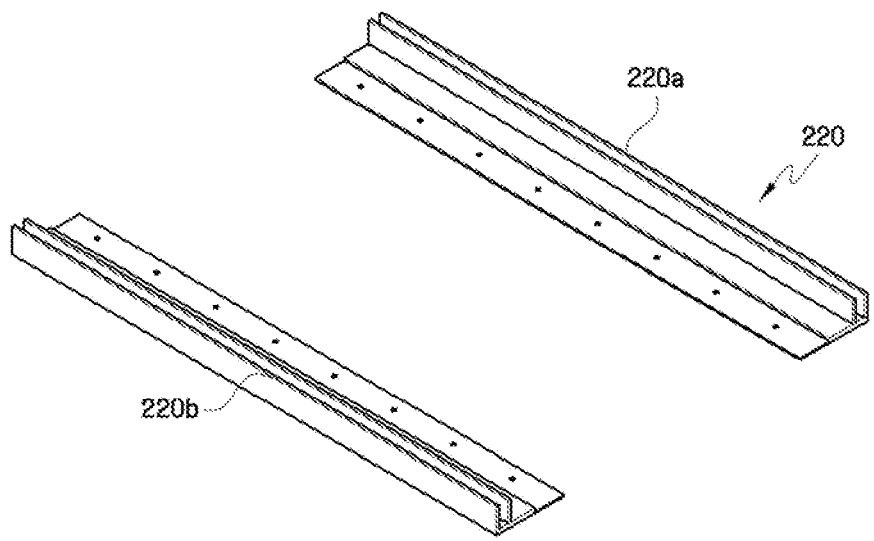
FIG. 3 is a perspective view of a light source unit-fixing frame according to the first exemplary embodiment of the present invention.
Figure 4:
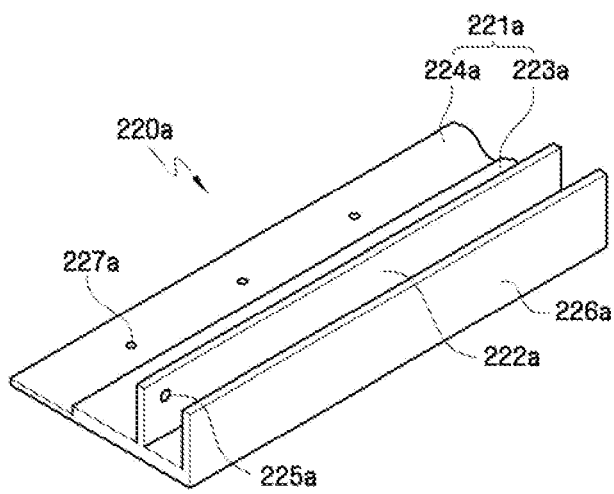
FIG. 4 is a perspective view of a main portion of the light source unit-fixing frame according to the first exemplary embodiment of the present invention.
Figure 5:
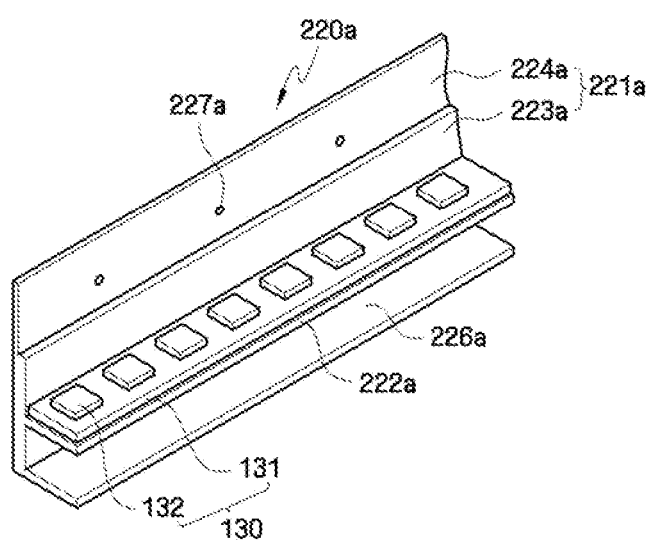
FIG. 5 is a perspective view showing the arrangement relationship between the light source unit-fixing frame and a light source unit according to the first exemplary embodiment of the present invention.

Hereinafter, the arrangement relationship between the light source unit-fixing frame 220 and the light source units 130 will be described in detail with reference to FIGS. 3 through 5. FIG. 3 is a perspective view of two portions of the light source unit-fixing frame 220 according to the first exemplary embodiment of the present invention. FIG. 4 is a magnified perspective view of one portion of the light source unit-fixing frame 220 according to the first exemplary embodiment of the present invention. FIG. 5 is a perspective view showing the arrangement relationship between the light source unit-fixing frame 220 and the light source units 130 according to the first exemplary embodiment of the present invention.

Referring to FIG. 3, the light source unit-fixing frame 220 of the first embodiment is not a single continuous frame structure, but is instead two separate parts: unit fixing frames 220a and 220b. Here, two frames 220a, 220b are shown, although alternative embodiments can employ different numbers of such frames. The light source unit-fixing frame 220 may dissipate heat, which is generated by the light source units 130, out of the lower housing 200.

Referring to FIG. 4, each of the unit fixing frames 220a and 220b includes a plate 221a, and first and second support walls 222a, 226a that extend substantially perpendicular to the plate 221a.

The plate 221a includes a first plate 223a connected to the first support wall 222a, and a second plate 224a connected to the first plate 223a. The second plate 224a is where the body portion 210 (see FIG. 1) of the lower housing 200 is placed. The second plate 224a is thinner than the first plate 223a. Specifically, an upper surface of the second plate 224a may be lower than that of the first plate 223a by a thickness of the body portion 210 (see FIG. 1) of the lower housing 200. That is, referring to FIG. 2, when the body portion 210 of the lower housing 200 is placed on the second plate 224a, the upper surface of the first plate 223a may be at the same height as an upper surface of a bottom plate of the body portion 210. This allows the reflective sheet 160 to be placed evenly on both the upper surface of the first plate 223a and the upper surface of the bottom plate 211 of the body portion 210.

The first support wall 222a of the unit fixing frame 220a extends from the plate 221a in a direction substantially perpendicular to the plate 221a (i.e. upward, from the view of FIG. 4).

Referring to FIG. 5, one of the light source units 130 is placed on the first support wall 222a. The point light sources 132 may be light-emitting diodes (LEDs) or any other suitable light sources. Specifically, the point light sources 132 are mounted on a first surface of the alignment board 131, and a second surface of the alignment board 131 is attached to the first support wall 222a. For example, alignment board-coupling holes 133 (see FIG. 1) may be formed in the alignment board 131, and the second surface of the alignment board 131 may be coupled to the first support wall 222a by coupling members such as screws. In this case, coupling holes 225a (see FIG. 4), which correspond respectively to the alignment board-coupling holes 133 (see FIG. 1), may be formed in the first support wall 222a. However, the present invention is not limited thereto. For example, the second surface of the alignment board 131 may be adhered to the first support wall 222a by a heat-dissipating adhesive tape.

The alignment board 131 may be shaped like a rectangular plate, as shown in FIG. 5. Alternatively, although not shown in the drawings, the alignment board 131 may be bent in an "L" shape. In the latter case, the alignment board 131 would include a first portion which is placed on the plate 221a, and a second portion which extends from the first portion to be substantially perpendicular to the first portion and which is attached to the first support wall 222a.

The alignment board 131 may have a circuit pattern (not shown) which connects the point light sources 132 to each other. The alignment board 131 may also be made of a thermally conductive material in order to increase the dissipation of heat generated by the point light sources 132.

Referring to FIGS. 3 through 5, the plate 221a of the light source unit-fixing frame 220 may be generally rectangular, as shown. The larger the area of the plate 221, the greater the heat dissipation efficiency of the light source unit-fixing frame 220. The area of the plate 221a can be adjusted according to factors such as heat dissipation efficiency and the weight of the LCD. The invention contemplates any suitable area for plate 221a.

A width of the first plate 223a (i.e., the distance to which it extends away from the first support wall 222a) may be equal to or greater than the sum of a thickness of the alignment board 131 and a thickness of the point light sources 132, so that the light sources 132 do not extend over the second plate 224a. An increase in the width of the first plate 223a may improve heat dissipation efficiency and reduce the probability that light emitted from the point light sources 132 will be seen at a boundary between the first plate 223a and the second plate 224a. Specifically, light emitted from the point light sources 132 may be seen at the boundary between the first plate 223a and the second plate 224a due to the step difference in height between the first plate 223a and the second plate 224a. However, if the width of the first plate 223a is increased, the distance that light emitted from the point light sources 132 should travel to reach the boundary between the first plate 223a and the second plate 224a may increase, thereby reducing the intensity of the light that reaches the boundary. Therefore, the first plate 223a may extend a predetermined distance from the point light sources 132, and the width of the first plate 223a may be adjusted in view of heat dissipation efficiency and the intensity of light that reaches the boundary between the first plate 223a and the second plate 224a.

The light source unit-fixing frame 220 contains a material having relatively high thermal conductivity. For example, the light source unit-fixing frame 220 may contain aluminum. The light source unit-fixing frame 220 may be formed using any suitable methods. For example, the light source unit-fixing frame 220 may be formed by snap-fitting, machining, welding, or otherwise assembling the plate 221a and the first support wall 222a. For the sake of efficiency, the light source unit-fixing frame 220 may be formed by extrusion molding using a pre-manufactured mold. The light source unit-fixing frame 220 may also be formed by press molding.

The second support wall 226a may be formed at an edge of the plate 221a. The second support wall 226a may be disposed parallel to the first support wall 222a, and supported by sidewalls of the intermediate housing 150 once the LCD panel is assembled (see FIG. 2). The second support wall 226a, together with the first support wall 222a, increases the rigidity of the backlight assembly 20 thus conferring benefits such as preventing distortion of the backlight assembly 20. In addition, the space or air gap between the second support wall 226a and the first support wall 222a serves as an air circulation passage, thereby enhancing the heat dissipation function of the light source unit-fixing frame 220.

Figure 6:
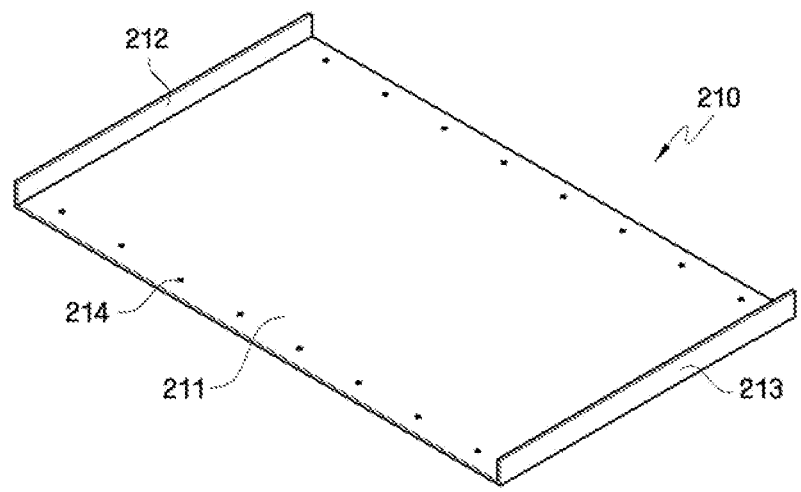
FIG. 6 is a perspective view of a body portion of a lower housing according to the first exemplary embodiment of the present invention.
Figure 7:
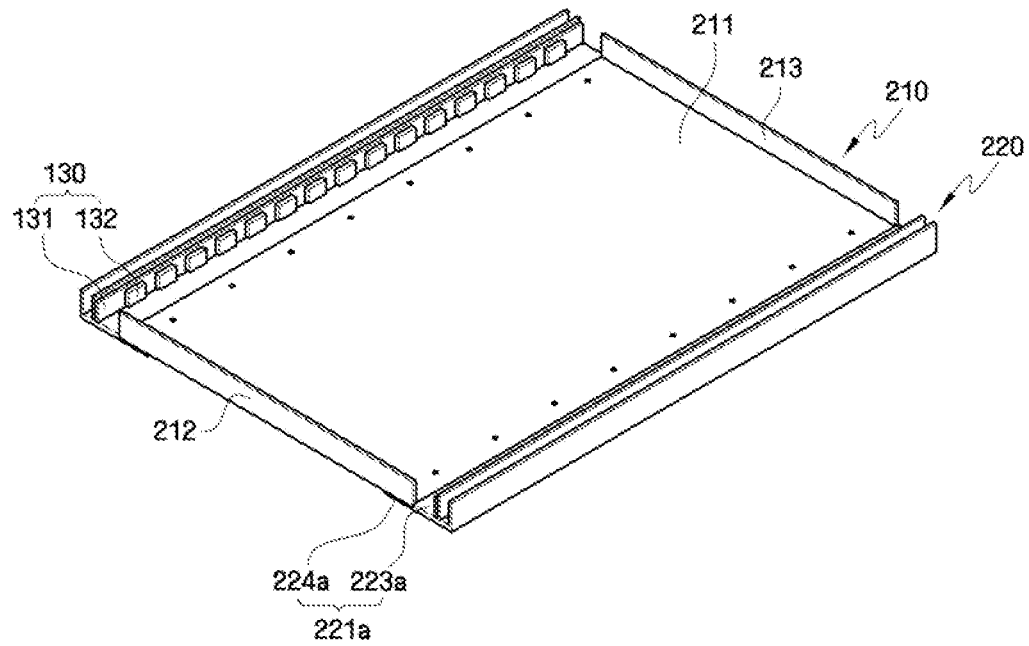
FIG. 7 is a perspective view showing the arrangement relationship between the body portion and the light source unit-fixing frame of the lower housing according to the first exemplary embodiment of the present invention.

The arrangement relationship between the body portion 210 and the light source unit-fixing frame 220 of the lower housing 200 will now be described with reference to FIGS. 2, 6 and 7. FIG. 6 is a perspective view of the body portion 210 of the lower housing 200 according to the first exemplary embodiment of the present invention. FIG. 7 is a perspective view showing the arrangement relationship between the body portion 210 and the light source unit-fixing frame 220 of the lower housing 200 according to the first exemplary embodiment of the present invention.

Referring to FIG. 6, the body portion 210 of the lower housing 200 includes bottom plate 211 and sidewalls 212 and 213 extending from both sides of the bottom plate 211. The sidewalls 212, 213 face each other, and extend in a direction generally perpendicular to the bottom plate 211. The body portion 210 of the lower housing 200 may be made of a material which can both protect the point light sources 132 from external impact and bring about a cooling effect by distributing heat more evenly. For example, the body portion 210 may be made of aluminum. The body portion 210 of this embodiment is simpler in structure than even a box. More specifically, only two sides of body portion 210 have upturned edges, rather than four. Thus, a die for manufacturing the body portion 210 of the lower housing 200 can be made more simply and easily, reducing both tooling and production costs.

Referring to FIG. 7, the light source unit-fixing frame 220 is disposed on, or attached to, those sides of the bottom plate 211 of the body portion 210 on which the sidewalls 212 and 213 are not formed. The body portion 210 and the light source unit-fixing frame 220 together form the lower housing 200 as a generally cuboid shaped box having an open top surface.

The body portion 210 of the lower housing 200 is placed on the light source unit-fixing frame 220. Specifically, the body portion 210 of the lower housing 200 is placed on the upper surface of the second plate 224a of the light source unit-fixing frame 220. The second plate 224a and the bottom plate 211 of the body portion 210 may then be coupled to each other using various methods. For example, lower housing-coupling holes 214 (see FIG. 6) may be formed in the bottom plate 211 of the body portion 210, and plate-coupling holes 227a (see FIG. 4) may be formed in the second plate 224a. Then, the bottom plate 211 of the body portion 210 may be coupled to the second plate 224a by screws or a caulking material. Unlike the illustration in FIG. 7, the second plate 224a and the bottom plate 211 of the body portion 210 may alternatively be coupled to each other by, for example, welding.

The plate 221a of the light source unit-fixing frame 220 is disposed under a lower surface of the bottom plate 211 of the body portion 210 while surrounding the bottom plate 211 of the body portion 210. Specifically, the lower surface of the bottom plate 211 of the body portion 210 may be tightly attached to the upper surface of the second plate 224a of the light source unit-fixing frame 220. In this embodiment, the LGP 140 is positioned within the boxlike cavity of lower housing 200, over the body portion 210 as well as at least the area of overlap between the body portion 210 and second plate 224a. The LGP 140 can also cover at least some of the first plate 223a.

The above-described configuration provides a relatively large surface area through which heat can be drawn from the light source unit 130. In particular, the unit-fixing frame 220a can be coupled to the light source unit 130 across the entire surface of first support wall 222a, and body portion 210 can be coupled to frame 220a across the entire surface of second plate 224a, as well as the relatively narrow vertical step between surfaces 224a and 223a. These relatively large surface areas allow for more efficient flow of heat out of the light source unit 130, through the frame 220a, and into the body portion 210. The optional presence of additional second support wall 226a provides a further outlet for heat from the light source unit 130. These mechanisms provide improved dissipation of heat from light source unit 130.

Additionally, the configuration of the above embodiment places the plate 221a in relatively close proximity to (though, in this embodiment, not overlapping) light source unit 130, so that in addition to facilitating conduction of heat away from unit 130, at least some radiation from unit 130 is also transmitted directly to plate 221a, without passing through any other components. Radiative heat can then be dissipated by the lower housing 200. In this manner, embodiments of the invention provide both improved conductive pathways and radiative pathways for dissipating heat from unit 130.

Figure 8:
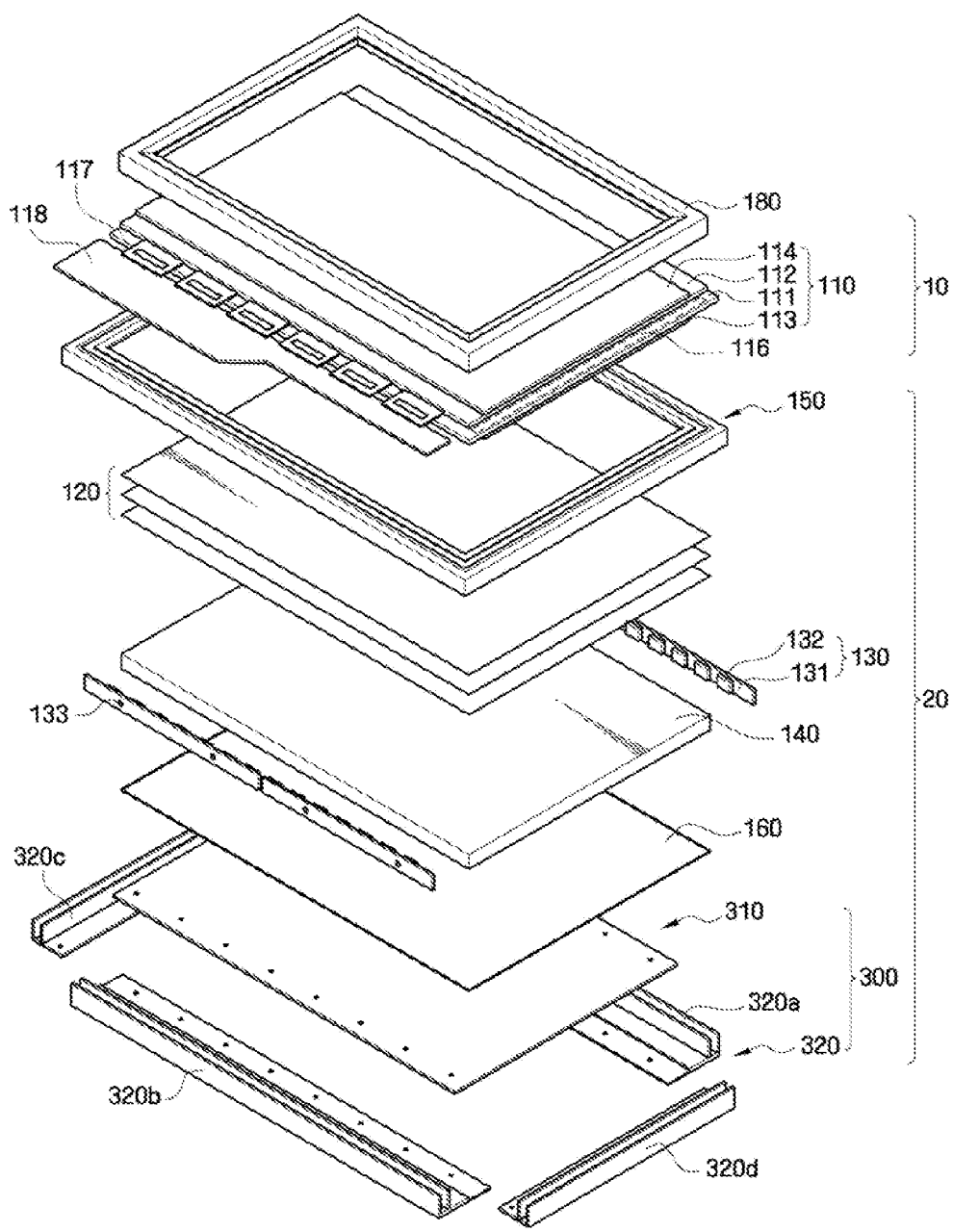
FIG. 8 is an exploded perspective view of an LCD according to a second exemplary embodiment of the present invention.
Figure 9:
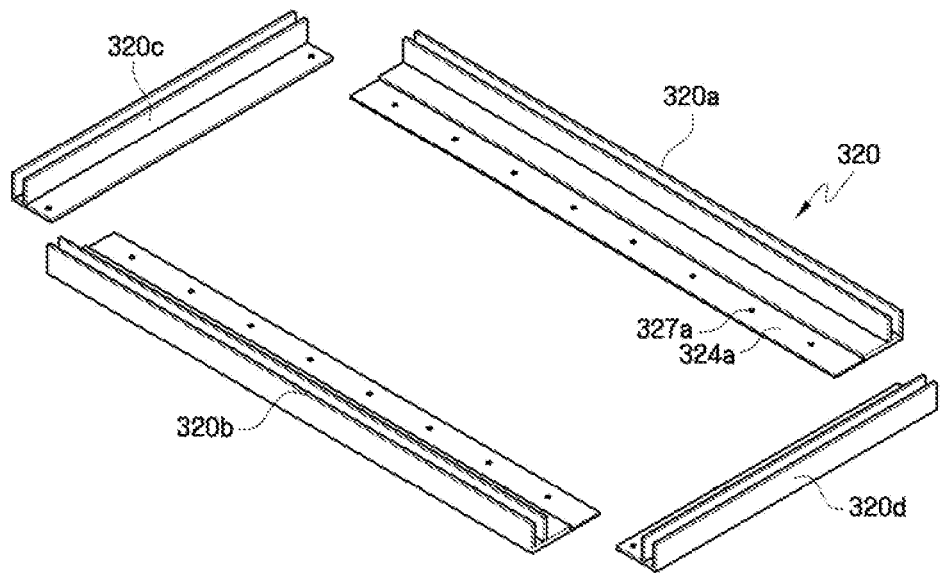
FIG. 9 is a perspective view of a light source unit-fixing frame according to the second exemplary embodiment of the present invention.
Figure 10:
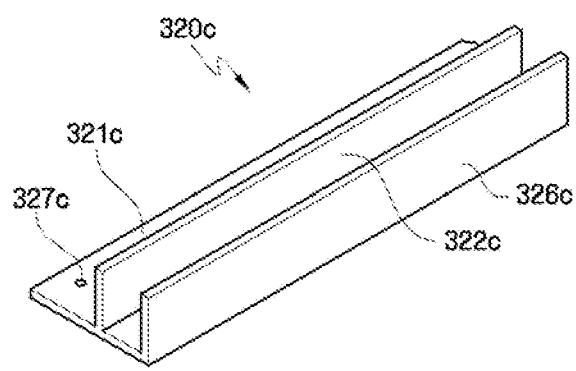
FIG. 10 is a perspective view of a main portion of the light source unit-fixing frame according to the second exemplary embodiment of the present invention.
Figure 11:
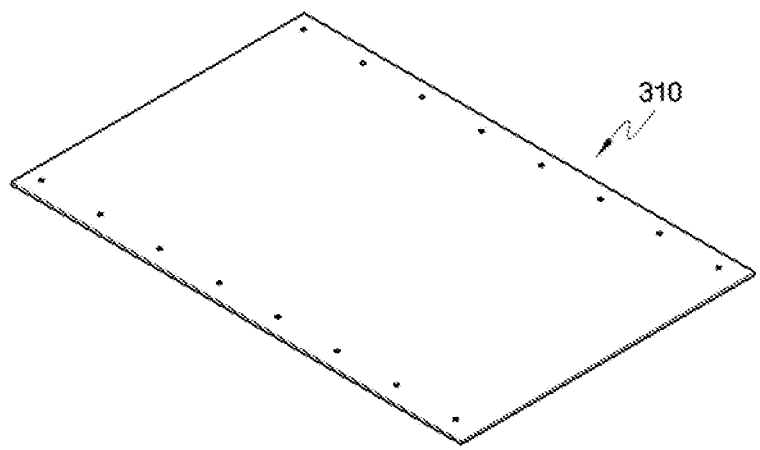
FIG. 11 is a perspective view of a body portion of a lower housing according to the second exemplary embodiment of the present invention.
Figure 12:
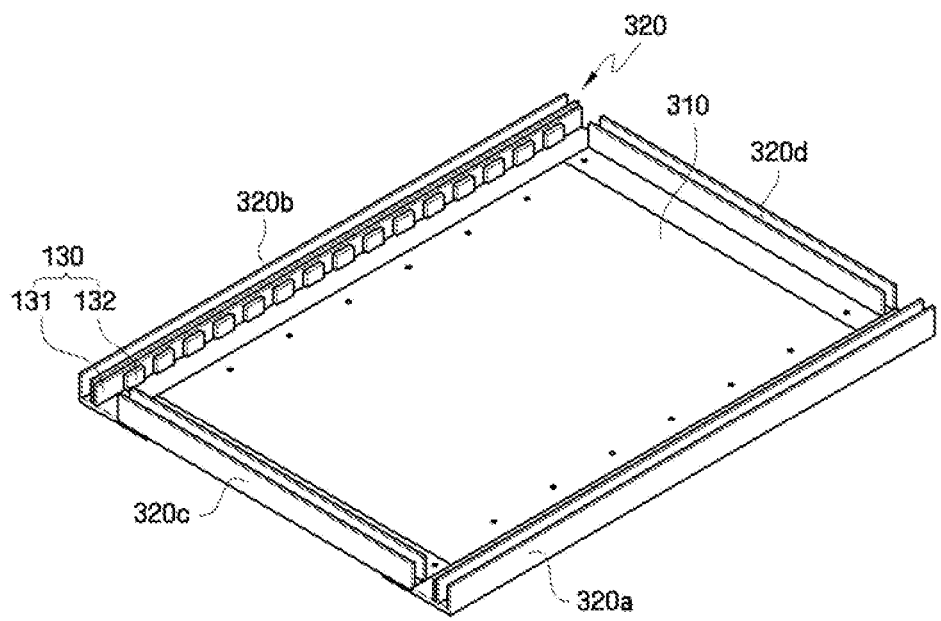
FIG. 12 is a perspective view showing the arrangement relationship between the body portion and the light source unit-fixing frame of the lower housing according to the second exemplary embodiment of the present invention.

Hereinafter, a backlight assembly and an LCD according to a second exemplary embodiment of the present invention will be described with reference to FIGS. 8 through 12. FIG. 8 is an exploded perspective view of the LCD according to the second exemplary embodiment of the present invention. FIG. 9 is a perspective view of a light source unit-fixing frame 320 according to the second exemplary embodiment of the present invention. FIG. 10 is a perspective view of a main portion of the light source unit-fixing frame 320 according to the second exemplary embodiment of the present invention. FIG. 11 is a perspective view of a body portion 310 of a lower housing 300 according to the second exemplary embodiment of the present invention. FIG. 12 is a perspective view showing an arrangement of the body portion 310 and the light source unit-fixing frame 320 of the lower housing 300 according to the second exemplary embodiment of the present invention. For simplicity, elements having the same functions as those according to the first exemplary embodiment are indicated by like reference numerals, and thus their description will be omitted or simplified.

Referring to FIGS. 8 and 9, the light source unit-fixing frame 320 of this embodiment is not a single continuous frame structure, but is instead four separate parts. More specifically, the unit fixing frames of this second exemplary embodiment comprise first unit fixing frames 320a and 320b, and second unit fixing frames 320c and 320d.

The first unit fixing frames 320a and 320b are substantially identical to the unit fixing frames 220a and 220b of the first exemplary embodiment shown in FIG. 3. Unlike the light source unit-fixing frame 220 of the first embodiment, the light source unit-fixing frame 320 of the second embodiment also includes second unit fixing frames 320c and 320d.

Referring to FIG. 10, the second unit fixing frame 320c includes a plate 321c and a first support wall 322c substantially perpendicular to the plate 321c. The plate 321c may be, for example, rectangular. The area of the plate 321c can be adjusted in view of heat dissipation efficiency and the weight of the LCD. For example, different thickness and width can be applied to different area of the plate 321 to optimize the heat dissipation efficiency and the weight of the LCD. A second support wall 326c may further be formed at an edge of the plate 321c. The second support wall 326c may be disposed parallel to the first support wall 322c, and supported by sidewalls of an intermediate housing 150 (see FIG. 8).

Referring to FIG. 11, the body portion 310 of the lower housing 300 (see FIG. 8) is shaped generally as a flat plate. Like body portion 210 of the first embodiment, body portion 310 of the second embodiment can have a boxlike, or simpler, structure. For example, here, body portion 310 can have two upturned edges, rather than four. Thus, a die for manufacturing the body portion 310 of the lower housing 300 can be fabricated more simply and easily, reducing tooling and production costs.

Referring to FIG. 12, the four parts of the light source unit-fixing frame 320 are affixed to the four sides of the body portion 310 of the lower housing 300, thereby forming a generally cuboid box having an open top surface. This forms the lower housing 300 (see FIG. 8), which has a housing space with a predetermined depth.

The body portion 310 and the second unit fixing frames 320c and 320d are each disposed on the upper surfaces of second plates 324a (see FIG. 9) of each of the first unit fixing frames 320a and 320b. A thickness of the plate 321c (see FIG. 10) may be equal to a thickness of the body portion 310 of the lower housing 300, such that the lower housing 300 (see FIG. 8) has an even housing surface. In other words, when assembled, the upper surface of the body portion 310 is substantially planar with the upper surfaces of the second unit fixing frames 320c, 320d.

Referring to FIGS. 9 and 10, plate-coupling holes 327c may be formed in the plate 321c, and in the second plate 324a. Accordingly, the second unit fixing frame 320c (or 320d) may be coupled to the first unit fixing frame 320a (or 320b) by methods such as screws, caulking, or welding.

In the LCD according to the second exemplary embodiment, heat delivered to the light source unit-fixing frame 320 can be directly dissipated out of the lower housing 300, both through all four of its sides, and through radiating directly onto the body portion 310 without passing through other components, thereby improving efficiency of heat dissipation.

Figure 13:
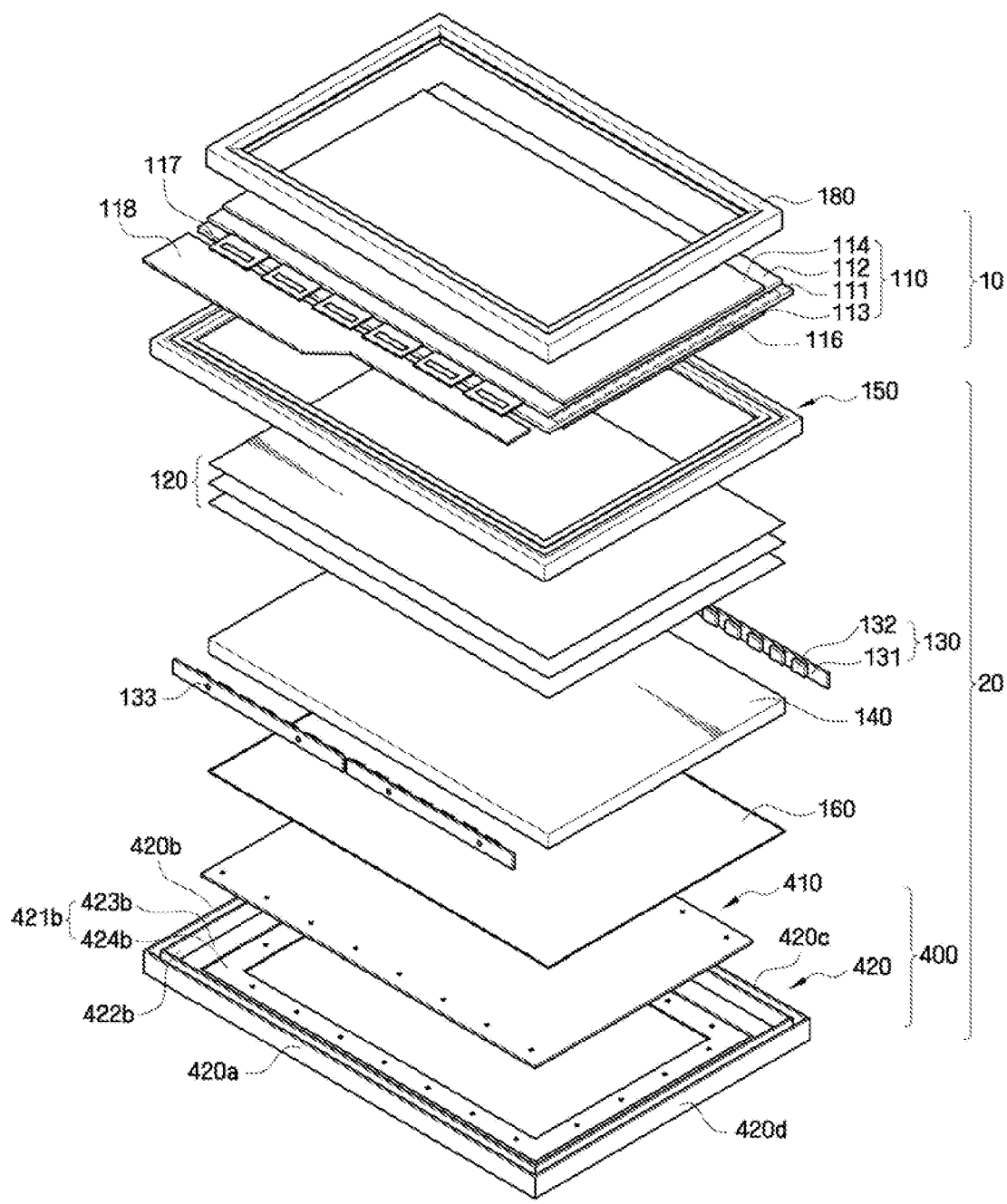
FIG. 13 is an exploded perspective view of an LCD according to a third exemplary embodiment of the present invention.

Hereinafter, a backlight assembly and an LCD according to a third exemplary embodiment of the present invention will be described in detail with reference to FIG. 13. FIG. 13 is an exploded perspective view of the LCD according to the third exemplary embodiment of the present invention. For simplicity, elements having the same functions as those according to the first and second exemplary embodiments are indicated by like reference numerals, and thus their description will be omitted or simplified.

Referring to FIG. 13, a light source unit-fixing frame 420 according to the third exemplary embodiment of the present invention may be configured as a single, continuous or integral frame structure. Specifically, the light source unit-fixing frame 420 may be shaped as a single rectangular frame having four sides 420a through 420d. As shown in FIG. 13, each side of the light source unit-fixing frame 420 may include a thicker support wall extending inward from the edge of the frame, and a thinner plate extending from that. For example, the side 420b of the light source unit-fixing frame 420 may include a first plate 423b which is connected to a first support wall 422b, and a second plate 424b which is connected to the first plate 423b and is thinner than the first plate 423b.

A flat plate-shaped body portion 410 of a lower housing 400 is affixed to the upper surface of each thinner plate (e.g., side 420b) to form the lower housing 400.

In the LCD according to the third exemplary embodiment, heat delivered to the light source unit-fixing frame 420 can be directly dissipated out of the lower housing 400 via conduction through frame 420 and radiation onto body portion 410 without passing through other components, thereby improving efficiency of heat dissipation.

Figure 14:
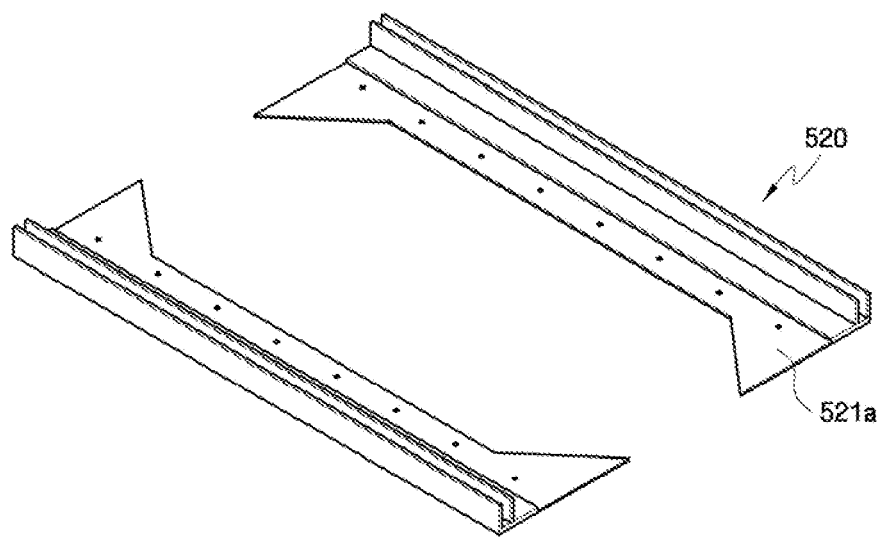
FIGS. 14 through 18 are views showing light source unit-fixing frames included in LCDs according to another exemplary embodiments of the present invention.
Figure 15:
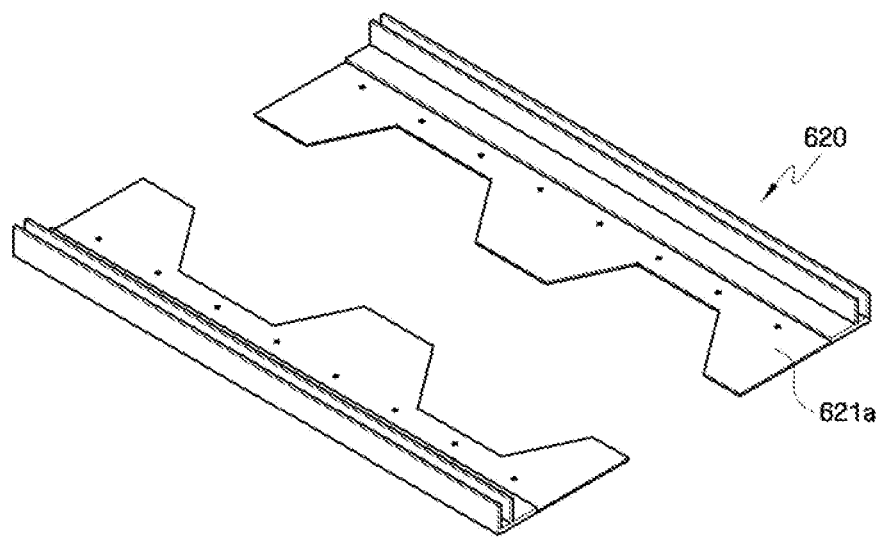

FIGS. 14 and 15 are views showing light source unit-fixing frames 520 and 620 included in LCDs according to another exemplary embodiment of the present invention. For ease of understanding, the light source unit-fixing frames 520 and 620 are explained below by comparison to the light source unit-fixing frame 220 of FIG. 3.

Referring to FIGS. 14 and 15, plates 521a and 621a of the light source unit-fixing frames 520 and 620 have non-uniform widths, whereas the plate 221a (see FIG. 4) of the light source unit-fixing frame 220 (see FIG. 3) has a generally uniform width.

The widths of the plates 521a and 621a may vary according to distribution of heat generation. For example, the plates 521a and 621a may be wide in regions where a relatively large amount of heat is generated, and may be narrow in regions where a relatively small amount of heat is generated (e.g., wider in areas proximate to light sources, narrower inbetween). If the widths of the plates 521a and 621a are increased in the regions where a relatively large amount of heat is generated, heat generated in those regions can be more easily dissipated out of the lower housing.

In FIG. 14, both ends of the plate 521a are wider than other portions thereof. In FIG. 15, both ends and a middle portion of the plate 621a are wider than other portions thereof. Although not shown in the drawings, each of the plates 520 and 620 may have other configurations. For example, each may be sawtoothed. That is, portions of each of the plates 520 and 620 that correspond to each of the point light sources 132 (see FIG. 1) may be wider than other portions.

Figure 16:
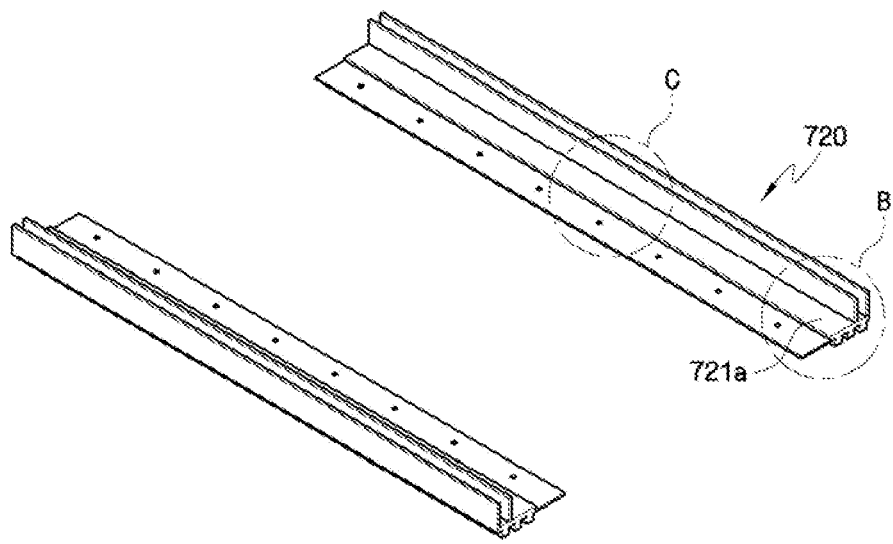
Figure 17A:
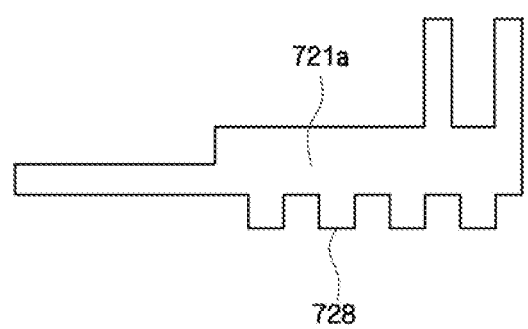
Figure 17B:
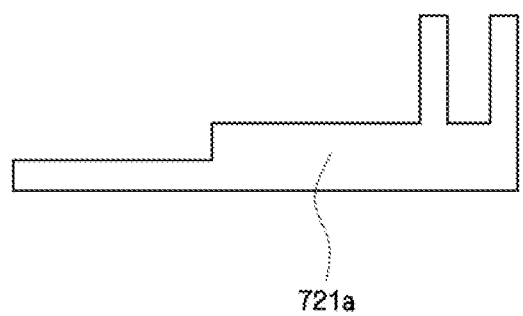

FIGS. 16, 17A, and 17B are views showing a light source unit-fixing frame 720 constructed according to another exemplary embodiment of the present invention. FIG. 17A is a cross-sectional view of a region B shown in FIG. 16, and FIG. 17B is a cross-sectional view of a region C shown in FIG. 16. For ease of understanding, the light source unit-fixing frame 720 is explained below by comparison to the light source unit-fixing frame 220 of FIG. 3.

Referring to FIGS. 16 and 17A, a lower surface of a plate 721a of the light source unit-fixing frame 720 may have an uneven portion 728, whereas the lower surface of the plate 221a (see FIG. 4) of the light source unit-fixing frame 220 (see FIG. 3) is substantially even. One can observe that the uneven portion 728 has a larger surface area than a corresponding even surface. That is, the uneven surface of portion 728 has greater surface area than an even surface that has the same footprint. Thus, embodiments employing an uneven portion 728 instead of an even surface have the capacity to dissipate more heat from the LCD.

Referring to FIGS. 17A and 17B, the generally uneven portion 728 may be formed on only part (the region B) of the lower surface of the plate 721a. For example, the uneven portion 728 may be formed in the region B where a relatively large amount of heat is generated, and may not be formed in the region C where a relatively small amount of heat is generated. Although not shown in the drawings, the uneven portion 728 may also be formed on the entire lower surface of the plate 721a. The invention contemplates uneven portions 728 of any geometry, placed anywhere on frame 720.

Figure 18:
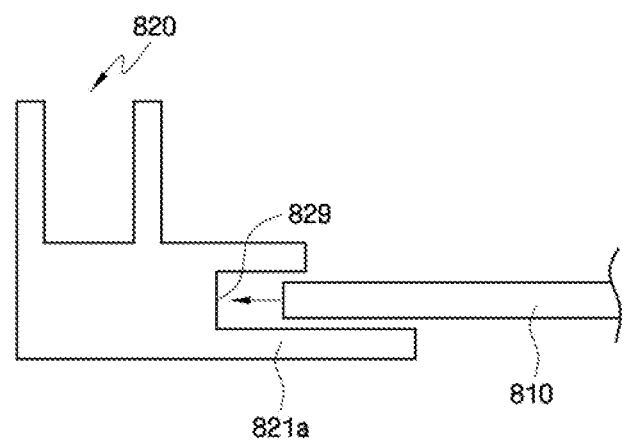

FIG. 18 is a view showing a light source unit-fixing frame 820 included in an LCD according to another exemplary embodiment of the present invention. For ease of understanding, the light source unit-fixing frame 820 is explained below by comparison to the light source unit-fixing frame 220 of FIG. 3.

Referring to FIG. 18, a groove portion 829 is formed in a plate 821a of the light source unit-fixing frame 820. A body portion 810 of a lower housing is inserted into this groove portion 829 coupling the two together. This eliminates or reduces the need for coupling members (such as screws) for coupling the light source unit-fixing frame 820 to the body portion 810.

Figure 19:
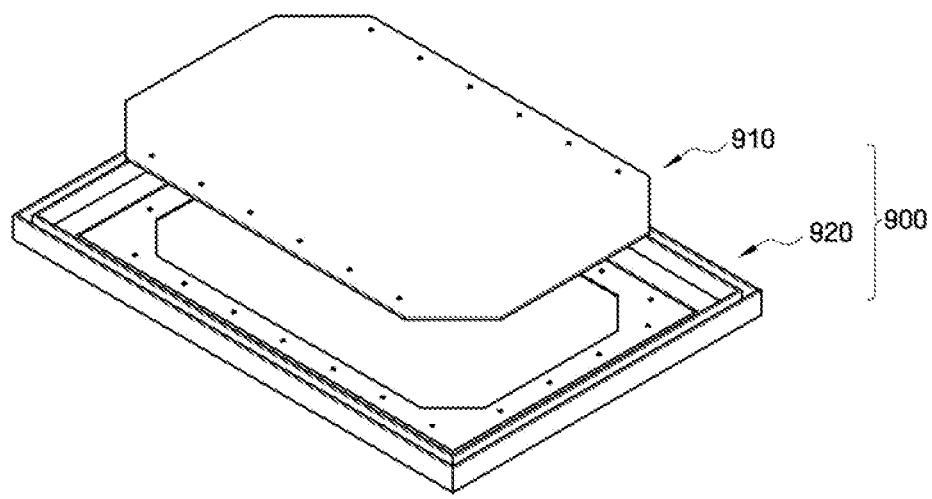
FIGS. 19 and 20 are views showing lower housings included in LCDs according to another exemplary embodiments of the present invention.

FIG. 19 is a view showing a lower housing 900 constructed according to another exemplary embodiment of the present invention. The lower housing 900 is explained below, mainly by comparison to the lower housing 400 of FIG. 13.

Referring to FIG. 19, a plate 921b of a light source unit-fixing frame 920 has a non-uniform width, while the plate 421b of the light source unit-fixing frame 420 (see FIG. 13) has a substantially uniform width. As described above with reference to the embodiments of FIGS. 14 and 15, the width of the plate 921b may vary according to distribution of heat generation.

While the body portion 410 of the lower housing 400 is shaped like a generally rectangular plate, the body portion 910 of the lower housing 900 may be shaped like a generally polygonal plate.

Figure 20:
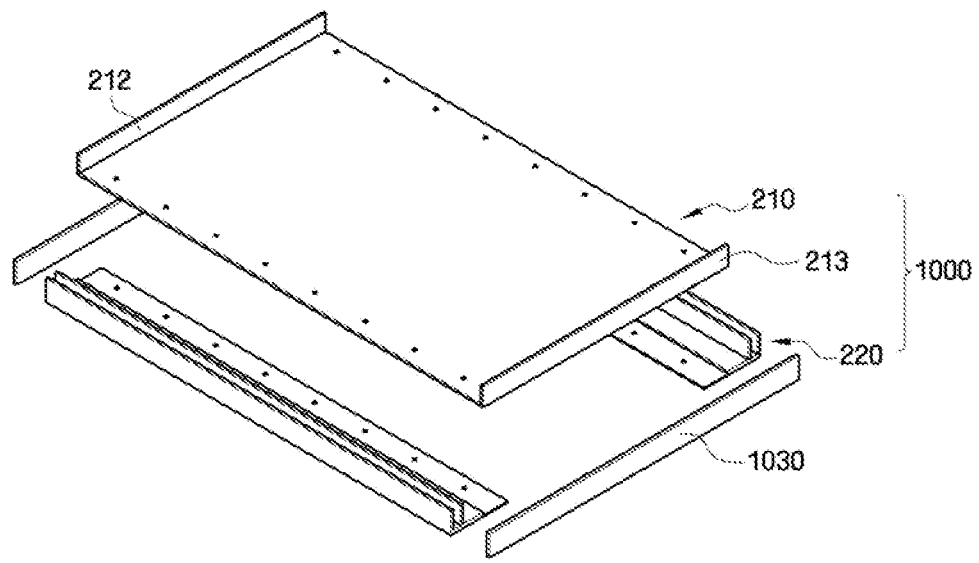

FIG. 20 is a view showing a lower housing 1000 constructed according to another exemplary embodiment of the present invention. The lower housing 1000 is explained below, mainly by comparison to the lower housing 200 of FIG. 1.

Referring to FIG. 20, the lower housing 1000 according may further include rigidity-reinforcing bars 1030 which are disposed on outer surfaces of sidewalls 212 and 213 of a body portion 210, and which are coupled to a light source unit-fixing frame 220 to form a generally rectangular frame. The rigidity-reinforcing bars 1030 are generally rectangular bars designed to increase the torsional rigidity and overall stiffness (e.g., resistance to any one or more of bending, torsion, compression, and tension) of the lower housing 1000, so as to better prevent distortion of a backlight assembly and protect the backlight assembly from an external impact. While the bars 1030 are shown here as generally rectangular, the invention contemplates any shape and placement of bars 1030 that increases the torsional and/or flexural rigidity of lower housing 1000.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A backlight assembly comprising:
a light guide plate;
a light source unit disposed on a side of the light guide plate;
an intermediate housing covering an upper surface of the light source unit; and
a lower housing coupled to the intermediate housing to accommodate the light guide plate and the light source unit,
wherein the lower housing comprises:
a body portion; and
a light source unit-fixing frame to which the light source unit is fixed,
wherein the light source unit-fixing frame comprises a plate having an upper surface on which the body portion is placed, a first support wall, and a second support wall,
wherein the light source unit is fixed to the first support wall,
wherein the second support wall is spaced from the first support wall and is disposed between the first support wall and a surface of the intermediate housing,
wherein the body portion is disposed under the light guide plate and is coupled to the light source unit-fixing frame, and
wherein the first support wall and the second support wall are directly connected to the plate.

2. The backlight assembly of claim 1, wherein the first support wall and the second wall are substantially perpendicular to the plate.

3. The backlight assembly of claim 2, wherein the upper surface of the plate contacts a lower surface of the body portion.

4. The backlight assembly of claim 2, wherein the second support wall faces an inner surface of a sidewall of the intermediate housing.

5. The backlight assembly of claim 2, wherein the plate comprises a first plate connected to the first support wall and the second support wall and comprises a second plate connected to the first plate, wherein the second plate is thinner than the first plate.

6. The backlight assembly of claim 5, wherein a lower surface of the body portion contacts an upper surface of the second plate, and an upper surface of a bottom plate of the body portion is substantially coplanar with an upper surface of the first plate.

7. The backlight assembly of claim 2, wherein the plate extends from the first support wall and the second support wall to a substantially uniform width.

8. The backlight assembly of claim 2, wherein:
the plate has first portions extending from the support wall to a first width, and second portions extending from the support wall to a second width; and the first portions are positioned proximate to light sources of the light source unit-fixing frame, and the second portions are positioned between the first portions.

9. The backlight assembly of claim 2, wherein a lower surface of the plate has a generally uneven surface.

10. The backlight assembly of claim 9, wherein the lower surface of the plate is opposite to the upper surface of the plate, and wherein the generally uneven surface is formed on at least a portion of the lower surface of the plate.

11. The backlight assembly of claim 1, wherein the body portion overlaps a portion of the light source unit-fixing frame, so as to form an overlap region of the light source unit-fixing frame; and
the light guide plate is positioned over at least the overlap region of the light source unit-fixing frame.

12. The backlight assembly of claim 1, wherein the light source unit does not overlap the body portion.

13. The backlight assembly of claim 1,
wherein the body portion comprises:
a bottom plate;
a first sidewall connected to a first side of the bottom plate and oriented substantially perpendicular to the bottom plate, wherein the light source unit-fixing frame is disposed at a second side of the bottom plate, the second side of the bottom plate being different from the first side of the bottom plate; and
a second sidewall protruding from a third side of the bottom plate in a direction generally perpendicular to the bottom plate, wherein the second side of the bottom plate is different from the third side of the bottom plate.

14. The backlight assembly of claim 13, further comprising a reinforcing member coupled to the light source unit-fixing frame so as to increase a stiffness of the lower housing.

15. The backlight assembly of claim 1, wherein the body portion is generally a flat plate, and a part of the light source unit-fixing frame is disposed on each side of the body portion.

16. The backlight assembly of claim 1, wherein the body portion is generally a flat plate, and the light source unit-fixing frame comprises a single structure extending along four sides of the body portion.

17. The backlight assembly of claim 1, wherein the light source unit-fixing frame and the body portion are coupled to each other by at least one of a weld, a screw, and a caulking material.

18. The backlight assembly of claim 1, wherein the light source unit-fixing frame further comprises a groove portion into which the body portion is inserted, so as to couple the body portion to the light source unit-fixing frame.

19. The backlight assembly of claim 1, wherein the light source unit-fixing comprises aluminum.

20. The backlight assembly of claim 1, wherein the first support wall and the second support wall overlap each other.

21. A liquid crystal display (LCD) comprising:
a liquid crystal panel configured to display an image;
a light guide plate disposed under the liquid crystal panel;
a light source unit disposed on a side of the light guide plate;
an intermediate housing covering an upper surface of the light source unit; and
a lower housing coupled to the intermediate housing to accommodate the light guide plate and the light source unit,
wherein the lower housing comprises:
a light source unit-fixing frame to which the light source unit is fixed; and
a body portion disposed under the light guide plate and coupled to the light source unit-fixing frame,
wherein the light source unit-fixing frame comprises:
a plate having an upper surface on which the body portion is placed;
a first support wall having the light source unit mounted thereon; and
a second support wall coupled to the inner surface of the intermediate housing and positioned apart from the first support wall with an air gap therebetween,
wherein the first support wall and the second support wall are directly connected to the plate.

22. The LCD of claim 21, wherein the first support wall and the second support wall are substantially perpendicular to the plate, and wherein the upper surface of the plate contacts a lower surface of the body portion.

23. The LCD of claim 22, wherein the second support wall faces an inner surface of a sidewall of the intermediate housing.

24. The LCD of claim 22, wherein:
the plate has first portions extending from the support wall to a first width, and second portions extending from the support wall to a second width; and
the first portions are positioned proximate to light sources of the light source unit-fixing frame, and the second portions are positioned between the first portions.

25. The LCD of claim 22, wherein a lower surface of the plate has a generally uneven surface.

26. The LCD of claim 21, wherein:
the body portion overlaps a portion of the light source unit-fixing frame, so as to form an overlap region of the light source unit-fixing frame;
the light guide plate is positioned over at least the overlap region of the light source unit-fixing frame; and
the light source unit does not overlap the body portion.

* * * * *